(12) United States Patent
De Sa et al.

(10) Patent No.: US 7,728,264 B2
(45) Date of Patent: Jun. 1, 2010

(54) PRECISION TARGETING

(75) Inventors: Erwin De Sa, Tucson, AZ (US); Ebbert Marvin, Tucson, AZ (US); Rodney Krebs, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 752 days.

(21) Appl. No.: 11/243,842

(22) Filed: Oct. 5, 2005

(65) Prior Publication Data

US 2008/0001022 A1    Jan. 3, 2008

(51) Int. Cl.
*F42B 15/01* (2006.01)
*F41G 7/00* (2006.01)
*F42B 15/00* (2006.01)
*G06F 19/00* (2006.01)

(52) U.S. Cl. ........................ 244/3.15; 244/3.1; 244/3.11; 244/3.12; 244/3.14; 701/200; 701/207; 701/213; 89/1.11

(58) Field of Classification Search ........... 244/3.1–3.3; 701/200, 207, 213–216; 342/52–68, 73–81, 342/118, 146–158, 165–175, 195, 357.01–357.17; 89/1.11
See application file for complete search history.

(56) References Cited

U.S. PATENT DOCUMENTS

| | | | | |
|---|---|---|---|---|
| 5,260,709 A | * | 11/1993 | Nowakowski | ............... 342/62 |
| 5,310,134 A | * | 5/1994 | Hsu et al. | .................. 244/3.12 |
| 5,344,105 A | * | 9/1994 | Youhanaie | ................. 244/3.14 |
| 5,507,452 A | * | 4/1996 | Mayersak | ................. 244/3.15 |
| 5,554,994 A | * | 9/1996 | Schneider | .................. 244/3.19 |
| 5,657,947 A | * | 8/1997 | Mayersak | ................. 244/3.19 |
| 6,037,899 A | * | 3/2000 | Weber | ........................ 701/213 |
| 6,082,675 A | * | 7/2000 | Woodall et al. | ........... 244/3.23 |
| 6,157,875 A | * | 12/2000 | Hedman et al. | ........... 244/3.15 |
| 6,254,031 B1 | * | 7/2001 | Mayersak | ................. 244/3.22 |
| 6,564,146 B1 | * | 5/2003 | Meyer et al. | ................ 701/213 |
| 6,573,486 B1 | * | 6/2003 | Ratkovic et al. | ............ 244/3.2 |
| 6,666,401 B1 | * | 12/2003 | Mardirossian | ............. 244/3.11 |
| 6,779,752 B1 | * | 8/2004 | Ratkovic | ................... 244/3.15 |
| 6,883,747 B2 | * | 4/2005 | Ratkovic et al. | .......... 244/3.15 |
| 7,121,502 B2 | * | 10/2006 | Krikorian et al. | .......... 244/3.14 |
| 2004/0188561 A1 | * | 9/2004 | Ratkovic et al. | ........... 244/3.15 |

FOREIGN PATENT DOCUMENTS

EP          0583972 A1 * 2/1994

* cited by examiner

*Primary Examiner*—Bernarr E Gregory
(74) *Attorney, Agent, or Firm*—The Noblitt Group, PLLC

(57) ABSTRACT

The disclosed system, device and method for targeting and measurement of stationary target locations in addition to prediction of moving target positions for given weapon intercept times generally includes: a target location system (TLS) configured with a computing device, a GPS receiver, mapping software, calibration software and digital filtering software. Disclosed features and specifications may be variously controlled, adapted or otherwise optionally modified to improve target acquisition and engagement. Exemplary embodiments of the present invention generally provide for improved accuracy of range finders, magnetometers and inclinometers as well as for improved prediction of moving target positions.

22 Claims, 8 Drawing Sheets

PRECISION TARGETING

FIELD OF INVENTION

The present invention generally concerns targeting devices, targeting methods and precision GPS/INS missile guidance systems; and more particularly, representative and exemplary embodiments of the present invention generally relate to ground-based targeting equipment for the measurement of stationary target locations as well as prediction of moving target positions for a given intercept time.

BACKGROUND OF INVENTION

Conventional ground-based, man-portable Target Location Systems (TLS) exist in the U.S. Armed Services inventory. Representative examples include the Lightweight Laser Detector and Rangefinder (LLDR) and the Mark VII that are used for measuring stationary target positions. These systems generally use optical instrumentation for focusing and aiming for both night and day operations. They also employ laser rangefinders, magnetometers and inclinometers to measure range, azimuth and inclination. Typically, the operator turns the system on, goes through a relatively elaborate and tedious procedure of calibrating the magnetometer, lets the GPS acquisition complete, lets the camera warm up, focuses the camera on the target, places the crosshairs on the target aim point and pulls the trigger, which initiates the laser rangefinder to engage. The range, azimuth and inclination are then measured and processed in a GPS receiver to estimate target coordinates. The accuracy of the range finders are generally good; however, the accuracies of the magnetometers and inclinometers are marginal at best—generally resulting in large target position errors, especially at long ranges. To accommodate targeting errors, weapons with terminal seekers or weapons with large warheads have been employed. Both of these conventional solutions, however, are unsatisfactory because seekers are complex and expensive, while large warheads generally cause unnecessary collateral damage.

Some conventional target location systems that are mounted on specially designed tripods (for slewing and target tracking) have not been fully utilized because they have been designed for acquisition of stationary targets only. Precision attacks against moving targets with GPS guided weapons generally require that the weapons receive accurate data of predicted target position for a particular weapon intercept time with minimum delay. One way of accomplishing this has been to use conventional systems to estimate target velocity, predict target position at a given intercept time and uplink this data to an incoming weapon via a data link for terminal guidance.

That notwithstanding, there remains a need to reduce TLS angular errors, to improve target location accuracy, to mitigate the need for elaborate and tedious calibration procedures, to reduce the need for expensive weapons with terminal seekers, and to minimize collateral damage. Additionally, there is a need to more effectively utilize target location systems to conduct precision attacks on moving targets by accurately predicting moving target positions for a given weapon intercept time.

SUMMARY OF THE INVENTION

In various representative aspects, the present invention provides for targeting and measurement of stationary target locations in addition to predicting of moving target positions for given weapon intercept times. Exemplary features generally include: a target location system (TLS) configured with a computing device, a GPS receiver, mapping software, calibration software and digital filtering software. The present invention further discloses operational targeting procedures for TLS instrument error calibration and target velocity estimation. Systems and methods for improving the accuracy of range finders, magnetometers and inclinometers are provided, as well as for improving prediction of moving target positions.

Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the Claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the claims, if any, are generally employed for descriptive purposes and not necessarily for comprehensively describing exclusive relative position.

Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventors' conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Target Locating System (TLS)

Figure 1:
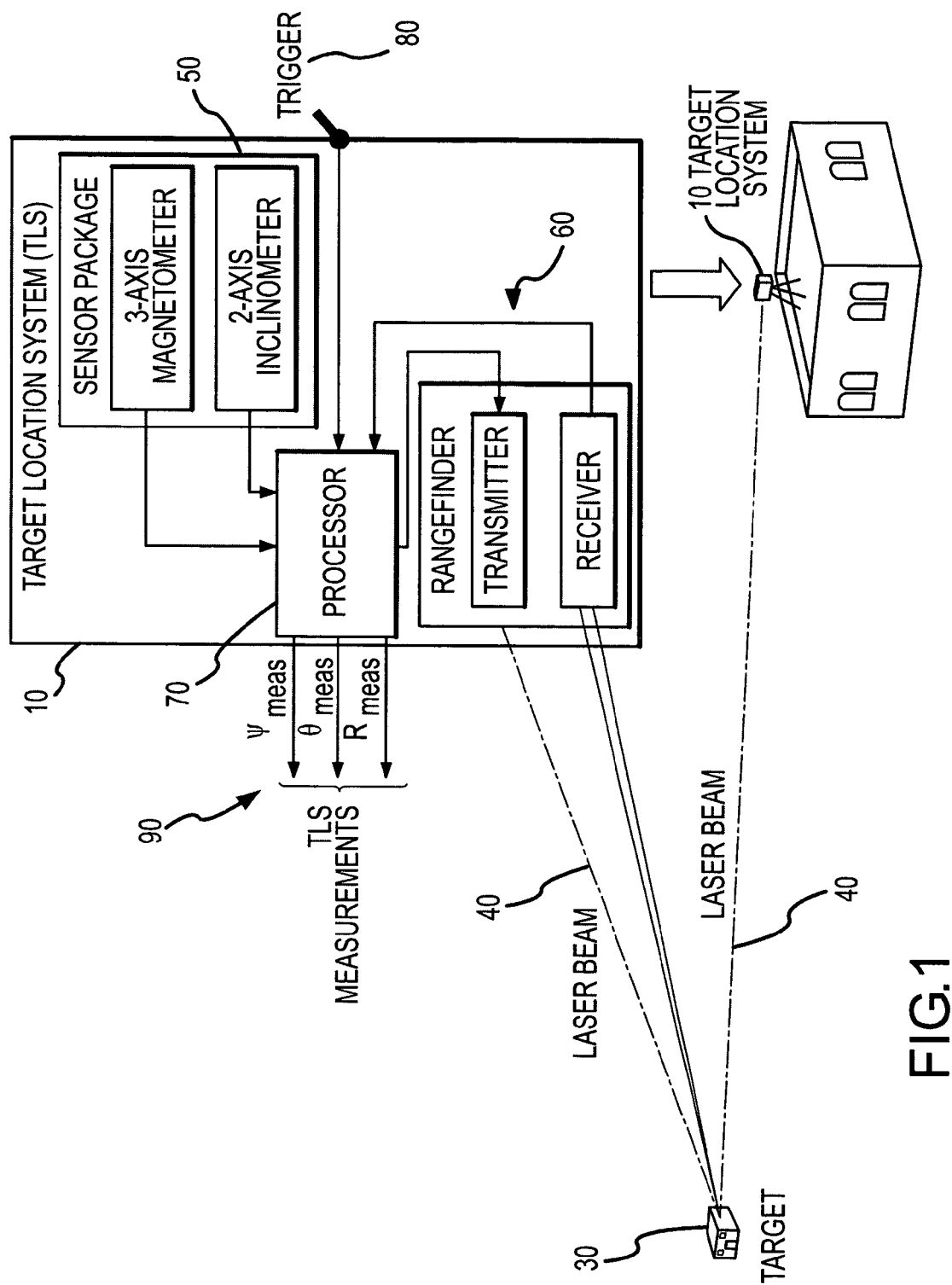
FIG. 1 representatively illustrates the operation of a Target Location System (TLS)

FIG. 1 representatively illustrates the operation of a typical TLS. TLS 10 generally includes range finder 60 and sensor package 50. Sensor package 50 comprises, for example, a three-axis magnetometer and a two-axis inclinometer. The three axes of the magnetometer are generally mutually orthogonal and measure the magnetic field of the earth in the TLS 10 forward, right and down axis. The inclinometer measures the pitch and roll angles of the TLS. Processor 70 uses rangefinder 60 measurements to compute the TLS 10 to target 30 range ($R_{meas}$). The rangefinder's laser is fired by depressing trigger 80. Some TLS models may also be suitably configured to query the TLS processor 70 to fire the range finder automatically at a fixed rate. Processor 70 uses the magnetometer measurements and the earth's geomagnetic field model database to compute the TLS azimuth angle ($\psi_{meas}$) with respect to true north. Processor 70 also uses both the magnetometer and inclinometer measurements to compute the inclination angle ($\theta_{meas}$) of the TLS with respect to local vertical. TLS measurement data 90 is then output on the processor's 70 output port.

After power-up, the TLS operator engages a procedure that calibrates most of the magnetometer sensor errors; however, due to errors in the earth's geomagnetic field model, the azimuth error is generally accepted as the largest source of targeting error. The magnetic field on the earth's surface is typically non-uniform and varies due inter alia to an uneven magnetic composition of the earth's crust. TLS azimuth and inclination errors are on the order of 13 mils (1-σ) and 7.5 mils (1-σ) respectively. These errors generally correspond to a 38 meter horizontal and a 22 meter maximum vertical targeting error when the target is 1 kilometer from the observer, and a 191 meter horizontal and 110 meter vertical targeting error when the target is 5 kilometers from the observer. Such large targeting errors generally operate to handicap the use of conventional TLS's for urban warfare, where smaller targeting errors are required. Accordingly, there is a need for a ground-based, man-portable system that can substantially reduce the current TLS errors. Moreover, there is a need to expand the role of existing TLS's by incorporating moving target velocity estimation and position prediction capabilities.

Real-Time Targeting System (RTTS)

Figure 2:
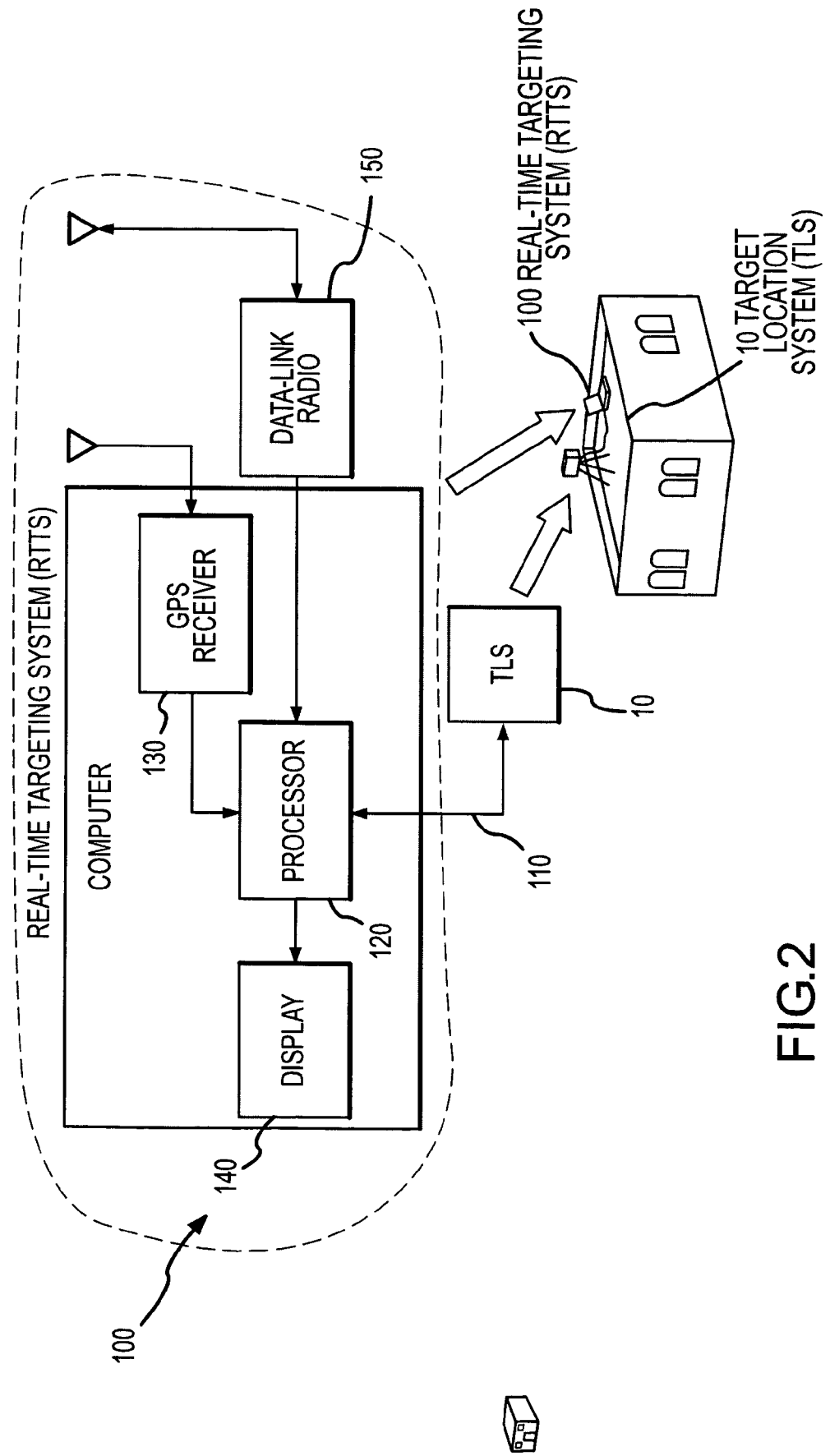
FIG. 2 representatively illustrates the operation of a Real-Time Targeting System (RTTS) in accordance with an exemplary embodiment of the present invention.

FIG. 2 representatively illustrates the operation of a Real-Time Targeting System (RTTS) in accordance with an exemplary embodiment of the present invention for stationary and moving targets. RTTS 100 includes a computing device, an imbedded GPS receiver 130 and an externally connected data link radio 150. The computer comprises a processor 120 and a display 140. Processor 120 may be adapted to execute software suitably configured for TLS calibration, moving target filtering, target position computation, mapping, modem data linking, and/or the like. The present invention is not limited to a specific computing device platform, but may be configured or otherwise suitably adapted for any type of computer or digital processor.

GPS receiver 130 comprises a highly accurate receiver. The present invention is not limited to an imbedded GPS receiver. An externally connected GPS receiver may be alternatively, conjunctively or sequentially used. Data link radio 150 may be any data link suitably configured to transmit targeting data and/or receive weapon position data. In the representatively depicted embodiment, the computer receives the TLS 10 measurement data via cable 110. The present invention is not limited to the representatively depicted cable 110, but also may include any data transfer mechanism, such as, for example, wireless system protocols for data transfer from the TLS to the computer.

The magnetometer error (or azimuth error) is generally sensitive to the geomagnetic field model and to metallic objects in the local measurement vicinity. Assuming that metallic objects may be avoided, it can be shown that the magnetometer error is a constant over a certain area on the earth's surface. Specifically, field tests confirm that the TLS measured azimuth and inclination angles have a constant bias error.

First Exemplary Method

Figure 3:
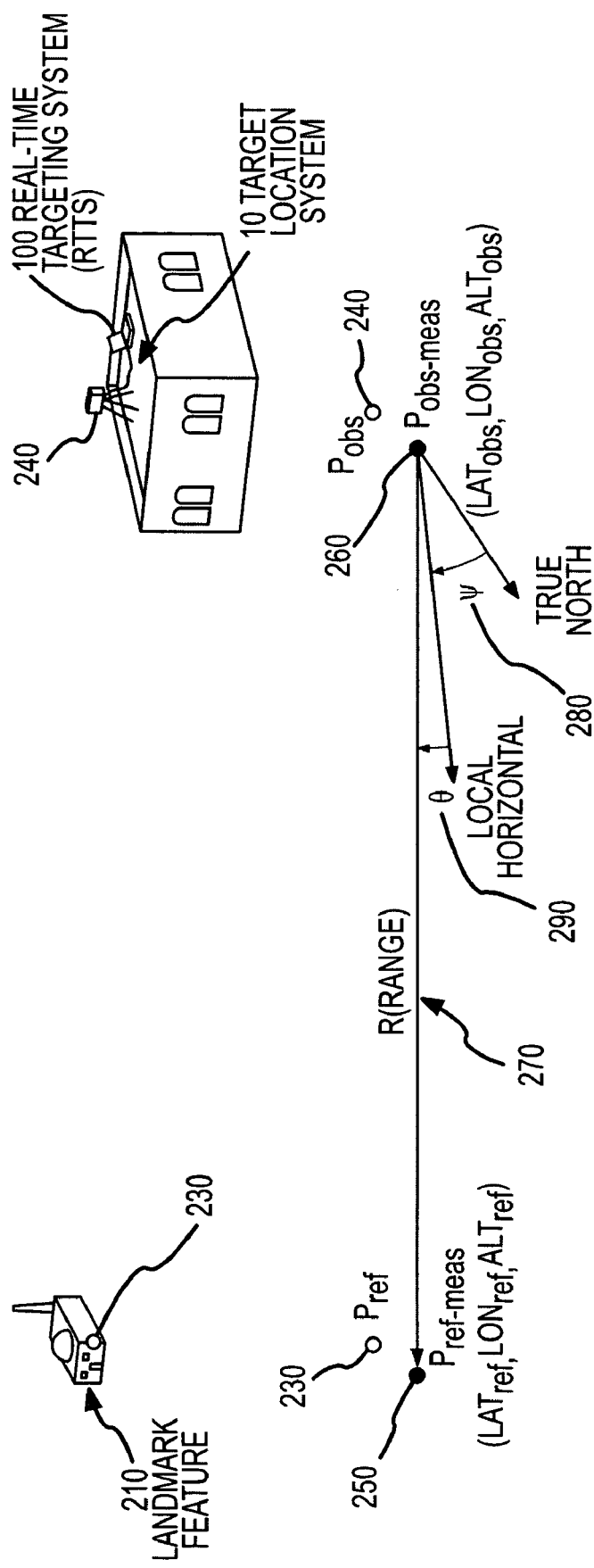
FIG. 3 representatively illustrates a TLS calibration procedure that uses a pre-surveyed landmark feature and relative-GPS in accordance with an exemplary embodiment of the present invention.

FIG. 3 representatively illustrates the operation of a first TLS calibration method that uses a pre-surveyed landmark feature 210 and a relative GPS technique. TLS 10 measures range to landmark feature 210 as well as azimuth and inclination angle with respect to the earth's geographic reference. TLS 10 may be calibrated by using a landmark feature 210 (generally, in substantially unobstructed view of the TLS), a portable GPS receiver, a computing device, and software (RTTS) 100 using a procedure described as follows:

Step 1: select a landmark feature 210 in relatively unobstructed view of TLS 10; use RTTS 100 to take a GPS position reading $P_{ref\text{-}meas}$ ($Lat_{ref}$, $Lon_{ref}$, $Alt_{ref}$) 250 of the landmark feature 210 at point $P_{ref}$ 230; and store in RTTS-processor 100.

Step 2: use RTTS 100 GPS receiver to take a TLS 10 self-position reading $P_{obs\text{-}meas}$ ($Lat_{obs}$, $Lon_{obs}$, $Alt_{obs}$) 260 at point $P_{obs}$ 240 and store in RTTS 100 processor.

Due to GPS error, both measurements $P_{obs\text{-}meas}$ 260 and $P_{ref\text{-}meas}$ 250 will have similar offsets, as generally depicted for example in FIG. 3. The offset error, however, will generally be within the GPS accuracy budget. It is well-accepted that the relative error of two GPS measurements, taken by the same GPS receiver observing the same GPS satellites, is substantially accurate. The accuracies obtained generally range from several centimeters to 2 meters. This method of surveying is typically termed "Relative Positioning GPS". The accuracy of this method is improved when the C/A code and the phase of carrier L1 of the GPS signal structure is used at each epoch of the navigation message, on the order of every 12 to 15 seconds. The accuracy of the TLS angular calibration will depend on the method used for Relative Positioning GPS. Of course, any suitably adapted method may be employed to meet specific operating recommendations or requirements.

With reference to FIG. 3, even though $P_{obs\text{-}meas}$ 260 and $P_{ref\text{-}meas}$ 250 have a constant GPS error offset, they are generally geometrically similar to points $P_{obs}$ 240 and $P_{ref}$ 230, because the GPS measurements $P_{obs\text{-}meas}$ 260 and $P_{ref\text{-}meas}$ 250 were physically taken at points $P_{obs}$ 240 and $P_{ref}$ 230 respectively.

Step 3: execute calibration software on RTTS 100 processor to compute the range vector R 270 from point $P_{obs\text{-}meas}$ 260 to point $P_{ref\text{-}meas}$ 250 as follows:

$$R_{north} = (Lat_{ref} - Lat_{obs})\Gamma_{earth\text{-}nom}$$

$$R_{east} = \cos[Lat_{obs}](Lon_{ref} - Lon_{obs})\Gamma_{earth\text{-}nom}$$

$$R_{up} = (Alt_{ref} - Alt_{obs})$$

where $\Gamma_{earth\text{-}nom}$ is the Earth's nominal radius.

Execute the calibration software again to compute the range magnitude (|R|), azimuth angle ($\psi$) and inclination angle ($\theta$) as follows:

$$|R| = \sqrt{R_{east}^2 + R_{north}^2 + R_{up}^2}$$

$$\psi = \arctan\left[\frac{R_{east}}{R_{north}}\right]$$

$$\theta = \arctan\left[\frac{R_{up}}{|R|}\right]$$

This is the estimated range, azimuth and inclination angles from the TLS 10 to landmark feature 210. This data may then be stored, for example, on the RTTS 100 processor.

Step 4: align TLS 10 crosshairs on the reference point $P_{ref}$ 230 and take measurement. The TLS 10 measures range ($R_{meas}$) to reference point $P_{ref}$, azimuth with respect to true north ($\psi_{meas}$) and inclination with respect to local vertical ($\theta_{meas}$), as generally depicted, for example, in FIG. 1.

Step 5: employ RTTS 100 processor to check if the difference between the measured range ($R_{meas}$) from step no. 4 and the computed range (|R|) from step no. 3 is less than about 2 meters. If true, then compute the TLS azimuth error ($\psi_{bias}$) and inclination error ($\theta_{bias}$) as follows:

$$\psi_{bias} = \psi_{meas} - \psi$$

$$\theta_{bias} = \theta_{meas} - \theta$$

Store the calibration corrections ($\psi_{bias}$, $\theta_{bias}$) in RTTS 100 processor and use them to correct subsequent TLS 10 measurements.

If the difference between measured range ($R_{meas}$) and the computed range (|R|) is more than 2 meters, then perform the calibration process again.

Steps 1, 2, and 4 may be performed substantially independently; however, step 3 generally follows steps 1 and 2, and step 5 generally follows steps 3 and 4.

The calibration procedure may be repeated for each time there is change in TLS 10 camera sight. The calibration correction for the day sight is generally not used for the night sight, since the day and night sights typically have different bias errors with respect to the axis of the magnetometer and inclinometer.

The calibration procedure may be repeated each time TLS 10 is relocated to another position to mitigate the effects of geomagnetic field modeling errors. Additionally, the landmark feature generally should be at least 1 kilometer from TLS 10. The calibration may be performed in a two to three hour period to ensure that the GPS accuracies are the same for all GPS measurements taken for the calibration.

Second Exemplary Method

Figure 4:
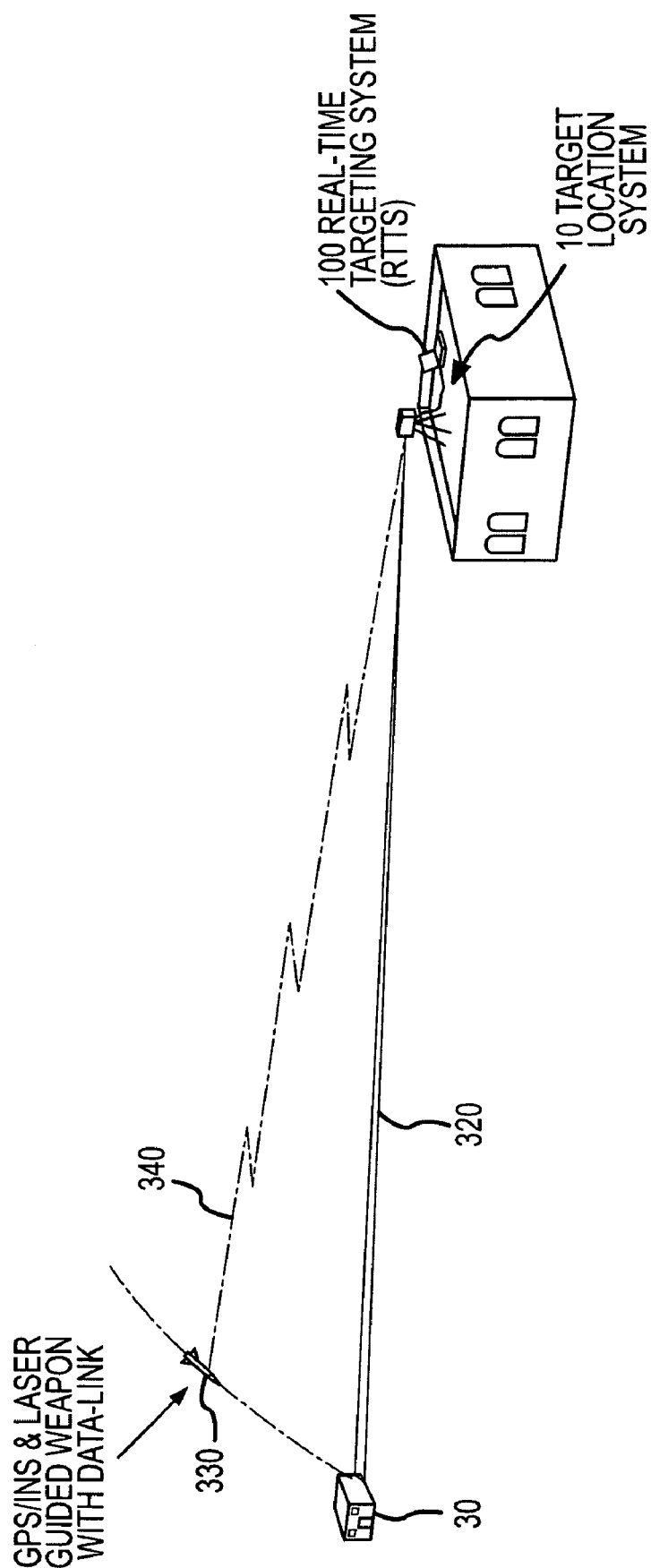
FIG. 4 representatively illustrates a TLS calibration procedure that uses a laser designator, a laser guided weapon with GPS/INS and a data link in accordance with an exemplary embodiment of the present invention.

Sometimes it may be impossible to measure the GPS coordinates of a feature in a given landmark. In an alternative method, the GPS coordinates of the landmark feature (first target) may be obtained by guiding a GPS/INS, laser guided weapon to the landmark feature and using a data link to download the weapon GPS coordinates to the RTTS. FIG. 4 generally illustrates the operation of such an alternative calibration method in a procedure as follows:

Step 1: select stationary target 30 in clear view of TLS 10 and use TLS 10 to measure range ($R_{meas}$), azimuth ($\psi_{meas}$) and inclination ($\theta_{meas}$) as described in step no. 4 of the first exemplary method disclosed vide supra.

Step 2: use RTTS 100 data link to request launch of GPS/INS and data link equipped laser guided weapon 330 against the target 30. Use TLS 10 laser designator to point laser beam 320 to guide weapon 330 to target 30. A few seconds before impact, use weapon 330 to download to RTTS 100 processor (via data link) its GPS coordinates, range to target (measured by sensor) and velocity. Store this data on RTTS 100 processor. After visible confirmation that the weapon has successfully hit the intended target, use the last stored weapon GPS coordinates, range to target and velocity to compute weapon GPS coordinates at time of impact. Assume weapon GPS coordinates at impact to be the target coordinates and store coordinates on RTTS 100 processor.

Step 3: use RTTS 100 processor and GPS receiver to determine the self-position of TLS 10 as described in step no. 2 of the first method disclosed vide supra.

Step 4: use RTTS 100 processor to take the target position computed in step no. 2 immediately above and self-position computed in step no. 3 immediately above to compute the range magnitude (|R|), azimuth angle ($\psi$) and inclination angle ($\theta$) as described in step no. 3 of the first method disclosed vide supra.

Step 5: use RTTS 100 processor to take the data from step no. 1 and step no. 4 immediately above to compute the TLS azimuth error ($\psi_{bias}$) and inclination error ($\theta_{bias}$) as described in step no. 5 of the first method disclosed vide supra. Use the calibration corrections to correct subsequent TLS 10 measurements.

The terminal guidance accuracy of the laser guided weapon should generally be good enough to meet the reference point accuracy requirements. Additionally, the accuracy of the weapon's terminal ranging sensor and the weapon velocity estimate must be generally good enough to meet these same requirements.

Third Exemplary Method

As with the second disclosed method, sometimes it may be difficult to measure the GPS coordinates of a feature in a landmark. A third method disclosed herein uses a relative-GPS technique similar to the one disclosed in the first method, except the GPS coordinates of the landmark feature are generally obtained by using a highly accurate Control Image Base (CIB) map. A CIB database contains digital aerial photographic map data of surveyed area. Included with the data is the pre-surveyed and mensurated horizontal plane coordinates (latitude and longitude) of each point on the map. The coordinates of any point on a CIB map may not match up perfectly with the GPS receiver coordinates of the same point on the map. This is due to GPS error and the position error of the CIB map. If the position of one point on a CIB map is calibrated with a GPS receiver, then the GPS position of any point on the CIB map may be determined accordingly. Accordingly, this method may be used to determine the GPS coordinates of a landmark feature.

Figure 5:
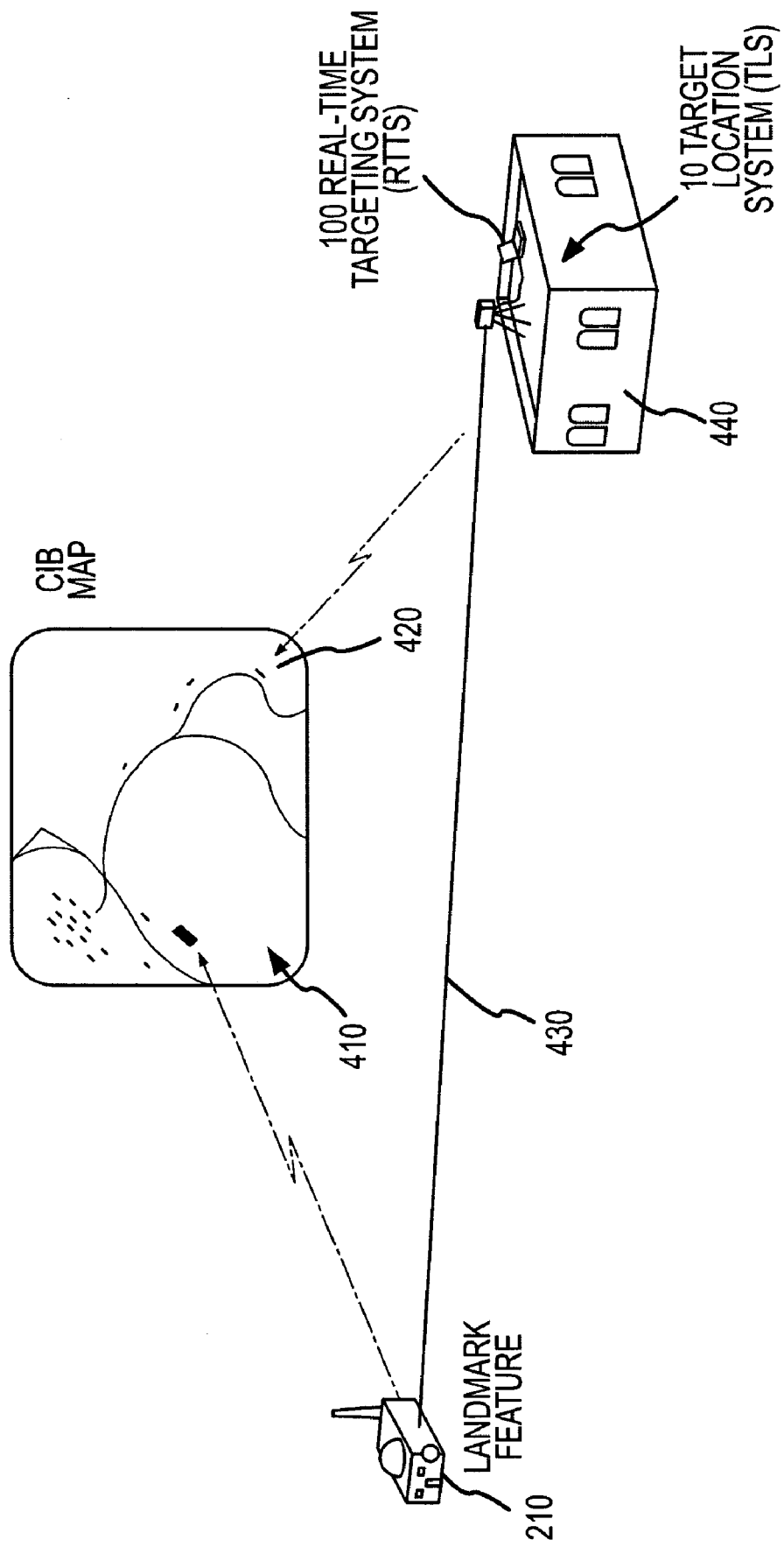
FIG. 5 representatively illustrates a TLS calibration procedure that uses a digital map and relative-GPS in accordance with an exemplary embodiment of the present invention.

FIG. 5 representatively illustrates the operation of such a method. This method calibrates the TLS 10 azimuth and inclination errors in a procedure as follows:

Step 1: use RTTS 100 processor and GPS receiver, CIB map 410 and an identifiable feature 440 on CIB map 410, near forward observer 20 to determine CIB map 410 error. Select a landmark feature 210, in clear view of TLS 10 and, readily identifiable on CIB map 410. Select an aim point on landmark feature 210; determine corrected GPS coordinates using data generated in step no. 1.

Step 2: use RTTS 100 processor and GPS receiver to determine the self-position of TLS 10, as described, for example, in step no. 2 of the first method embodiment.

Step 3: use RTTS 100 processor to take the landmark feature position computed in step no. 1 vide supra and the self-position computed in step no. 2 vide supra to compute the range magnitude (|R|), azimuth angle ($\psi$) and inclination angle ($\theta$) as described, for example, in step no. 3 of the first method embodiment.

Step 4: use TLS 10 to measure range ($R_{meas}$), azimuth with respect to true north ($\psi_{meas}$) and inclination with respect to local vertical ($\theta_{meas}$) as described, for example, in step no. 4 of the first method embodiment.

Step 5: use RTTS 100 processor to take data from step no. 3 and step no. 4 to compute the TLS azimuth error ($\psi_{bias}$) and inclination error ($\theta_{bias}$) as described, for example, in step no. 5 of the first method embodiment; use calibration corrections to correct subsequent TLS 10 measurement(s).

All specifications and parameter considerations that apply for the first method exemplary embodiment, generally apply to the third method representative embodiment. Additionally, the accuracy of the CIB map 410 should be on the order of about one (1) meter, while the point-to-point position error of objects in the CIB map 410 generally should be on the order of up to about 2 meters.

Moving Target Position Prediction with TLS Aiding

Some of the Target Location Systems (TLS) may be mounted on specially designed platforms that allow for easy azimuth and inclination slewing. These may include damped gimbals that at least partially mitigate oscillations (e.g., aim-point jitter) when the TLS slewing movement stops abruptly. TLS's equipped with these platforms may be used for estimating target velocity. Additionally, TLS mounted on accurate servo controlled gimbal platforms may be alternatively, conjunctively or sequentially employed. Target velocity may be estimated, for example, by integrating an existing TLS with the Real-Time Targeting System (RTTS).

Figure 6:
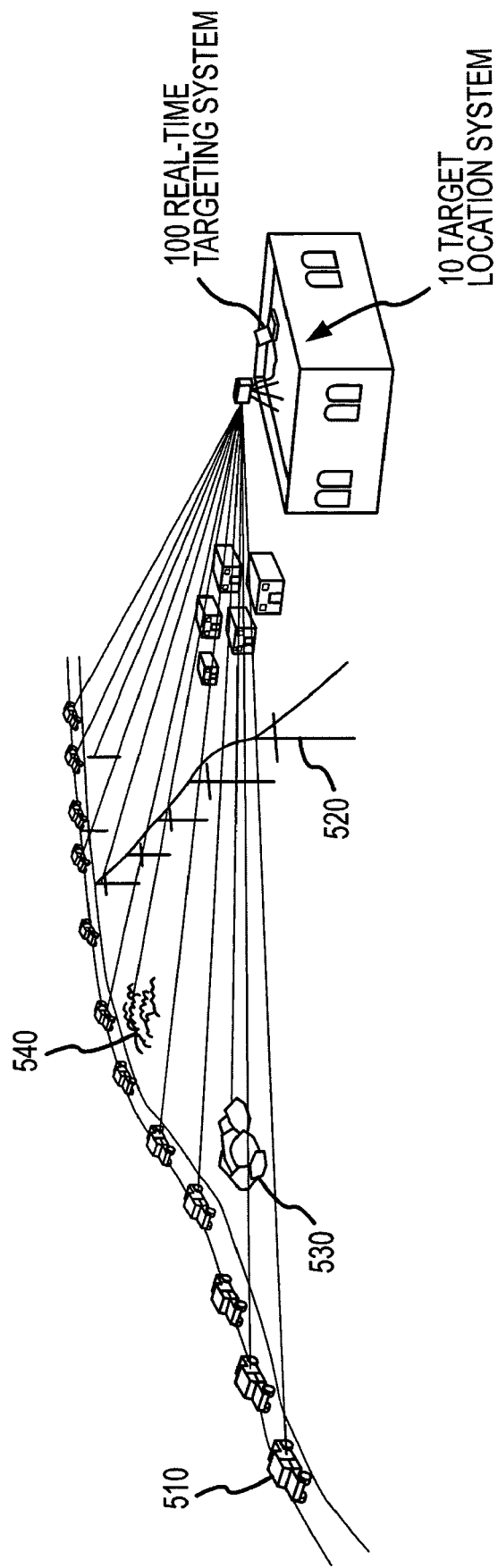
FIG. 6 representatively illustrates a target velocity estimation method using a TLS in accordance with an exemplary embodiment of the present invention.

FIG. 6 representatively illustrates the operation of an exemplary process for estimating moving target 510 velocity. TLS 10 may be slewed on a gimbaled platform and its camera used to zoom in on moving target 510, placing the TLS 10 crosshairs on the moving target centroid. TLS 10 may be slewed substantially continuously on a gimbaled platform to maintain crosshairs 'on target' throughout the engagement. This procedure may either be performed manually or a tracking algorithm may be used to track the target substantially automatically and a servo controller may be used to slew the gimbals to maintain the target in the crosshairs of TLS 10 camera sight. The TLS rangefinder may be substantially automatically triggered at regular intervals with the measured time, range, azimuth and inclination angles stored on the RTTS 100 processor. Consecutive TLS measurements may be used to estimate target velocity. As representatively depicted in FIG. 6, the laser beam of TLS 10 rangefinder may be adapted to strike obstructions like trees/plants 540, rocks 530, poles 520, and/or the like. Additionally, TLS 10 may miss the target and the laser beam may hit the ground in front of the target or far behind. Such false range returns will generally be rejected to correctly measure the moving target velocity.

Target Location System

Figure 7:
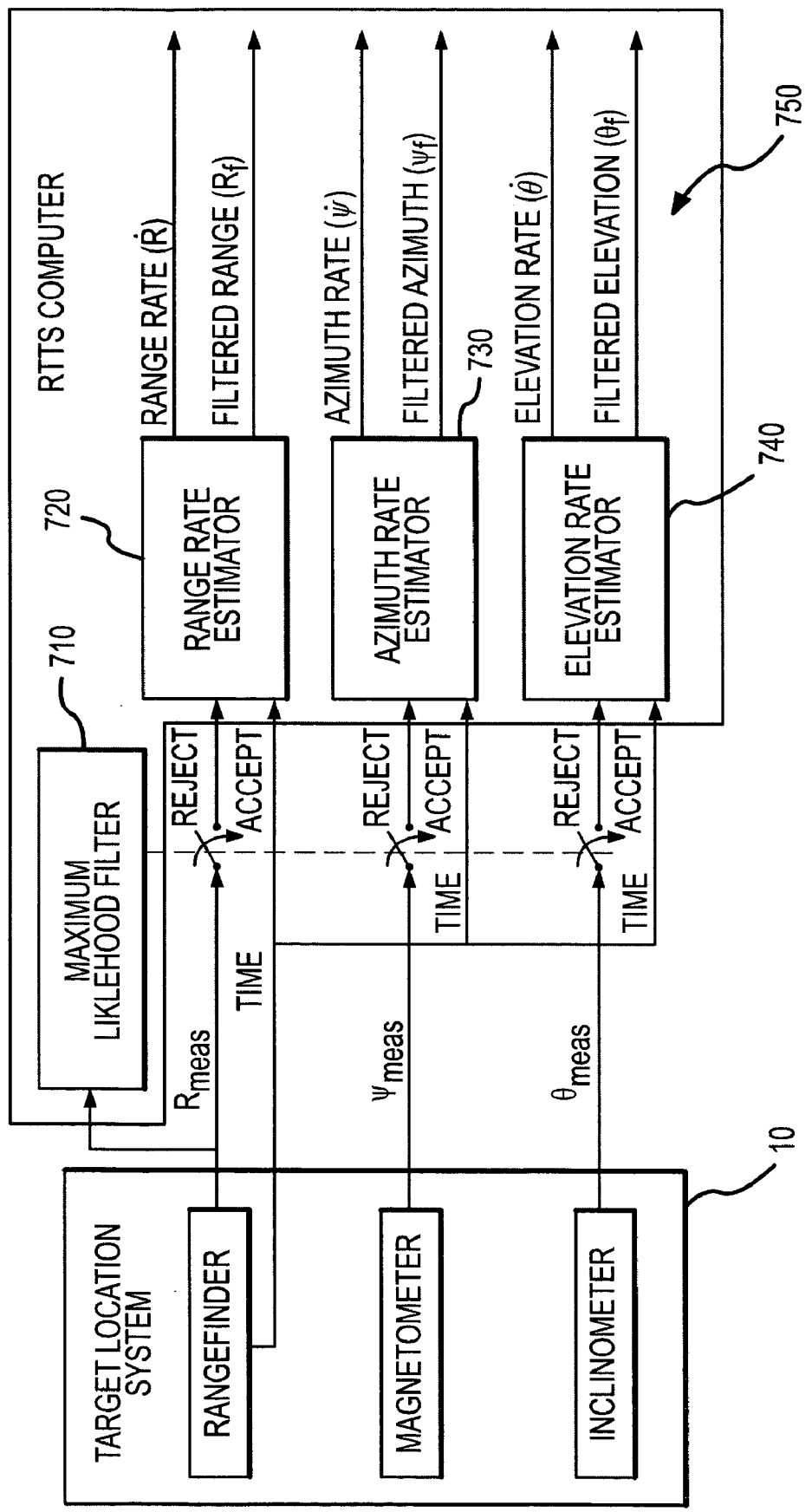
FIG. 7 representatively illustrates a filtering algorithm for a target velocity estimator in accordance with an exemplary embodiment of the present invention.

FIG. 7 representatively depicts the operation of a filtering algorithm used for estimating moving target velocities. The processing steps, in no particular order, may be configured as follows:

Step 1: RTTS 750 processor reads in TLS 10 range ($R_{meas}$) azimuth ($\psi_{meas}$) and inclination ($\theta_{meas}$) measurements.

Step 2: RTTS 750 processor uses a Maximum Likelihood Filter 710 to substantially automatically reject false range returns from obstructions in the laser path, such as: trees/plants, poles, and/or the like. The first three TLS 10 range measurements may generally be assumed to be accurate. The Maximum Likelihood Filter 710 uses a priori knowledge of target dynamics to estimate the size of the maximum likelihood range gate. Range measurements outside the expected range limit may then be rejected and the TLS measurements for those time intervals are not provided for subsequent processing.

Step 3: Three independent, two-state Kalman Filters may be used to estimate intermediate variables. Range Rate Estimator 720 may be used to estimate filtered slant-range ($R_f$) and slant-range rate $$\left(\frac{\partial R}{\partial t}\right).$$

Azimuth Estimator 730 may be used to estimate filtered azimuth ($\psi_f$) and azimuth rate $$\left(\frac{\partial \psi}{\partial t}\right).$$

Elevation Rate Estimator 740 may be used to estimate filtered inclination ($\theta_f$) and inclination rate $$\left(\frac{\partial \theta}{\partial t}\right).$$

These filters generally employ the well-accepted Kalman Filter approach that utilizes measurement time and two consecutive measurements to estimate rates. Each filter may be suitable configured to take into account the system and measurement noise characteristics of the TLS 10 instruments.

Figure 8:
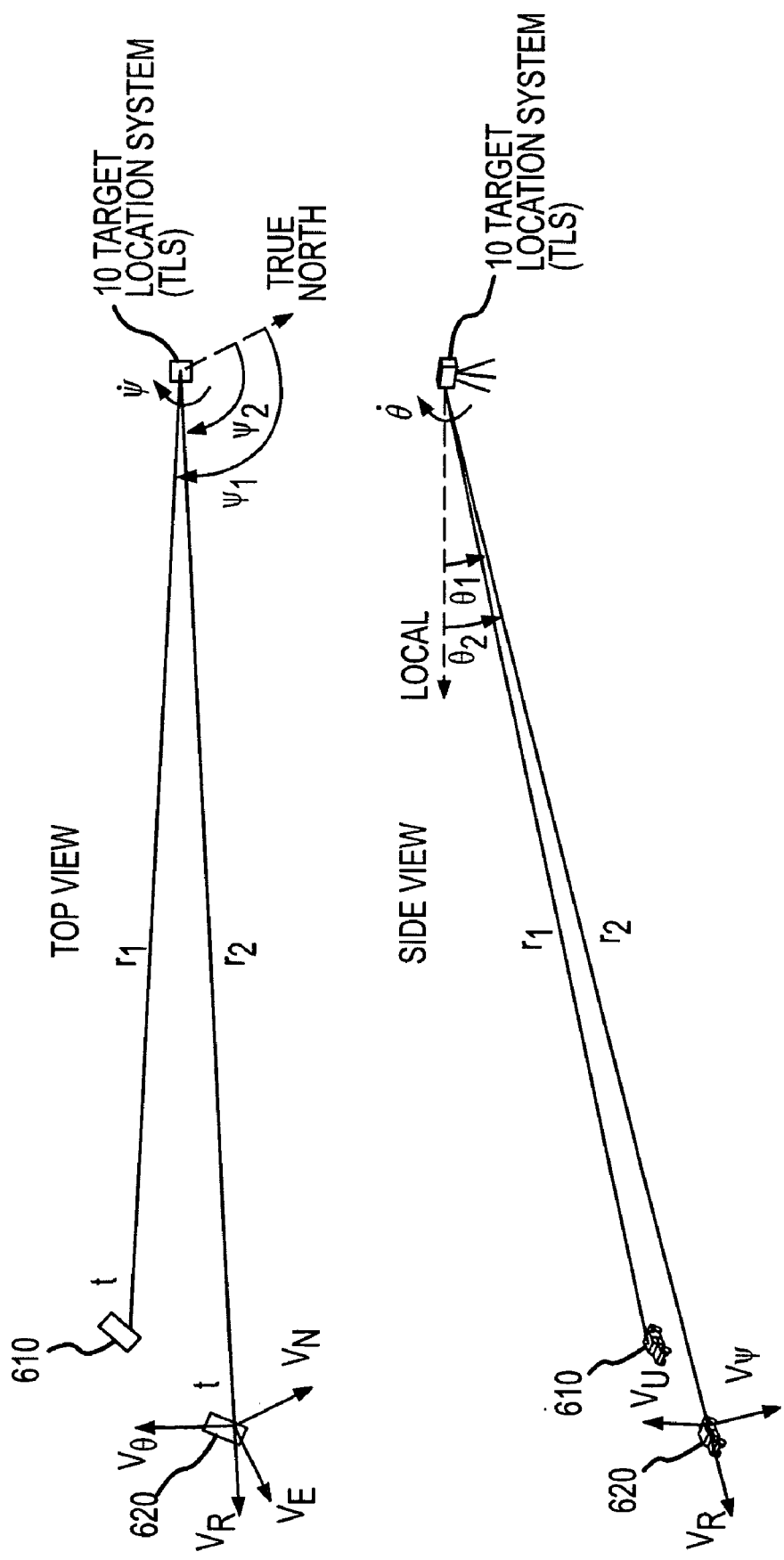
FIG. 8 representatively illustrates an instrument axis of a TLS and an estimated target velocity axis in accordance with an exemplary embodiment of the present invention.

FIG. 8 generally illustrates representative coordinate frames of the TLS instruments and the coordinate frame of the estimated velocity vector. With reference to FIG. 8, assume that at time $t_1$, the moving target is at position 610 and the TLS measured slant-range to a moving target is $r_1$, the measured azimuth is $\psi_1$ and the measured inclination is $\theta_1$. Also assuming that at the next TLS measurement at time $t_2$, the moving target is at position 620 and the TLS measured slant-range to the moving target is $r_2$, the measured azimuth is $\psi_2$ and the measured inclination is $\theta_2$.

Two consecutive measurements may be processed in, for example, the three filters generally depicted in FIG. 7, in order to estimate: filtered slant-range and slant-range rate; filtered azimuth and azimuth rate; and filtered inclination and inclination rate.

After the filtering process is complete, the RTTS processor computes the velocity vector ($V_R$, $V_\theta$, $V_\psi$) in the TLS slant-range frame as follows:

$$V_R = \frac{dR}{dt}$$

$$V_\theta = R_f \frac{d\theta}{dt}$$

$$V_\psi = R_f \frac{d\psi}{dt}$$

The vector diagrams in FIG. 8 generally explain these equations.

The RTTS processor computes the target velocity vector ($V_E$, $V_N$, $V_U$) in the geographic frame as follows:

$$\begin{bmatrix} V_E \\ V_N \\ V_U \end{bmatrix} = \begin{bmatrix} \cos\theta_f \sin\psi_f & \cos\psi_f & -\sin\theta_f \sin\psi_f \\ \cos\theta_f \cos\psi_f & -\sin\psi_f & -\sin\theta_f \cos\psi_f \\ \sin\theta_f & 0 & -\cos\theta_f \end{bmatrix} \begin{bmatrix} V_R \\ V_\theta \\ V_\psi \end{bmatrix}$$

The RTTS processor then computes the predicted target position as follows:

$$T_{lat\_p} = T_{lat\_present} + \frac{V_N \Delta t}{R_{earth\_nom}}$$

$$T_{lon\_p} = T_{lon\_present} + \frac{V_E \Delta t}{\cos(T_{lat\_present}) R_{earth\_nom}}$$

$$T_{alt\_p} = T_{alt\_present} + V_U \Delta t$$

Where, $T_{lat\_P}$ is the predicted target latitude at $\Delta t$ from the present, $T_{lat\_present}$ is the estimated latitude at the present time, $T_{lon\_P}$ is the predicted target longitude at $\Delta t$ from the present, $T_{lon\_present}$ is the estimated target longitude at the present time, $T_{altP}$ is the predicted target altitude at $\Delta t$ from the present, $T_{alt\_present}$ is the estimated target altitude at the present time, and $\Delta t$ is the difference between the prediction time interval and the present time.

The predicted target position data may then be sent to the weapon via the data link for each time a TLS measurement is received.

Moving Target Position Prediction Sensitivities

The disclosed TLS aided moving target position prediction method is sensitive to:

(1) Data latency error: The TLS instrument measurement time uncertainty is a source of error. Improved moving target position prediction accuracy will produce fewer data latency errors;

(2) Update Rate: Velocity is measured by using two consecutive TLS measurements. Many measurements may be rejected due to obstructions in the path of the rangefinder's laser beam. More TLS measurements (or higher update rates) will ensure improved target velocity accuracy;

(3) TLS jitter: When the TLS crosshairs oscillate from measurement to measurement, this causes the velocity estimate to spike which in turn causes instantaneous errors in computation of target velocity. Smooth motion of the TLS while target tracking is generally recommended to ensure better results. The jitter may be substantially avoided altogether by processing the TLS 10 camera video imagery in a tracking algorithm to track the target accurately and by using a gimbal servo controller to slew the TLS 10 gimbals to accurately center the tracked target in the TLS 10 camera's crosshairs;

(4) TLS wander: When the TLS crosshairs wanders off target, adding a spurious velocity component, the TLS crosshairs must be centered on the target throughout the engagement to ensure better results. This may be avoided by employing the same or substantially similar TLS 10 gimbal servo pointing method disclosed in exemplary method embodiment no. 3 vide supra;

(5) Target obscuration: When a target disappears behind an object, or when there is a bad weather condition (rain and snow), or when there is smoke—such conditions should be avoided to ensure better results.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A real-time targeting system, said system comprising:
   a computing device, said computing device configured with at least one of a user interface and a display;
   a GPS receiver; and
   a data link;
   said computing device configured to:
   reduce Target Location System angular measurement error; and execute at least one of target filtering software, target position prediction software, target position computation software, mapping software, and data link modem software.

2. The targeting system of claim 1, wherein at least one of said user interface and said display comprises a touch-screen.

3. The targeting system of claim 1, wherein said GPS receiver comprises at least one of a differential GPS receiver, a substantially integrated receiver, and a substantially external receiver.

4. The targeting system of claim 1, wherein said computing device is configured to receive digital target location measurement data via at least one of a cable and said data link.

5. The targeting system of claim 1, wherein said data link comprises a wireless data transmission.

6. The targeting system of claim 1, wherein said computing device is configured to host said software and to display at least one of a map and a pop-up window for interactive use by the operator.

7. The targeting system of claim 1, wherein said data link is configured to utilize a radio frequency data link having sufficient bandwidth to at least one of transmit targeting data and receive missile data.

8. The targeting system of claim 1, further comprising at least one of a magnetometer, an inclinometer, and an inertial measurement instrument for measuring at least one of azimuth and inclination.

9. The targeting system of claim 1, further comprising at least one optical element for at least one of focusing and aiming for at least one of nighttime operation and daytime operation of said targeting system.

10. The targeting system of claim 1, wherein at least one of said target filtering software and target position prediction software is configured to utilize target location system data to determine at least one of estimate moving target velocity and predict target position at a predetermined future time.

11. The targeting system of claim 1, wherein said target position computation software is configured to utilize at least one of target location system range, azimuth and inclination data and real-time targeting system GPS position data to compute target position coordinates.

12. The targeting system of claim 1, wherein said mapping software is configured to utilize control image base map data for at least one of display and extracting coordinates of selected points on a real-time targeting system display.

13. The targeting system of claim 1, wherein said data link modem software is configured to at least one of send and receive messages via a real-time targeting system data link to at least one of a weapon and another targeting system.

14. A method for real-time targeting, said method comprising the steps of:
providing a computing device having at least one of a user interface and a display;
providing a GPS receiver;
providing a data link; and
configuring said computing device to:
reduce Target Location System angular measurement error; and
execute at least one of target filtering software, target position prediction software, target position computation software, mapping software, and data link modem software.

15. The targeting method of claim 14, further comprising the step of configuring said computing device to receive digital target location measurement data via at least one of a cable and said data link.

16. The targeting method of claim 14, further comprising the step of configuring said data link to utilize a radio frequency data link having sufficient bandwidth to at least one of transmit targeting data and receive missile data.

17. The targeting method of claim 14, further comprising the step of providing at least one of a magnetometer, an inclinometer, an inertial measurement instrument for measuring at least one of azimuth and inclination, and at least one optical element for at least one of focusing and aiming.

18. The targeting method of claim 14, further comprising the step of configuring at least one of said target filtering software and target position prediction software to utilize target location system data to determine at least one of estimate moving target velocity and predict target position at a predetermined future time.

19. The targeting method of claim 14, further comprising the step of configuring said target position computation software to utilize at least one of target location system range, azimuth and inclination data and real-time targeting system GPS position data to compute target position coordinates.

20. The targeting method of claim 14, further comprising the step of configuring said mapping software to utilize control image base map data for at least one of display and extracting coordinates of selected points on a real-time targeting system display.

21. The targeting method of claim 14, further comprising the step of configuring said data link modem software to at least one of send and receive messages via a real-time targeting system data link to at least one of a weapon and another targeting system.

22. A computing device for real-time targeting, said device comprising:
at least one of a user interface, a touch-screen and a display;
at least one of a GPS receiver and a differential GPS receiver; and
at least one of a data link, a cable and a wireless data link;
said computing device configured to:
reduce Target Location System angular measurement error; and
execute at least one of target filtering software, target position prediction software, target position computation software, mapping software, and data link modem software;
said computing device configured to display at least one of a map and a pop-up window for interactive use by an operator;
said data link configured to utilize a radio frequency data link having sufficient bandwidth to at least one of transmit targeting data and receive missile data;
said computing device configured to at least one of receive and process at least one of azimuth and inclination data from at least one of a magnetometer, an inclinometer, and an inertial measurement instrument.

* * * * *